(12) United States Patent
Keck-Antoine et al.

(10) Patent No.: US 7,875,663 B2
(45) Date of Patent: Jan. 25, 2011

(54) COLOUR STABILISED POLYOLEFINS

(75) Inventors: Klaus Keck-Antoine, Jette-Bruxelles (BE); Claude Totelin, Woluwe St Lambert-Bruxelles (BE); Bruno Dejolier, St Stevens Woluwe (BE)

(73) Assignee: Chemtura Europe GmbH, Frauenfeld (CH)

( * ) Notice: Subject to any disclaimer, the term of this patent is extended or adjusted under 35 U.S.C. 154(b) by 367 days.

(21) Appl. No.: 11/993,641

(22) PCT Filed: Jul. 26, 2006

(86) PCT No.: PCT/EP2006/007363
§ 371 (c)(1),
(2), (4) Date: Dec. 21, 2007

(87) PCT Pub. No.: WO2007/017108
PCT Pub. Date: Feb. 15, 2007

(65) Prior Publication Data
US 2010/0081741 A1 Apr. 1, 2010

(30) Foreign Application Priority Data
Jul. 29, 2005 (GB) ................................ 515602.1

(51) Int. Cl.
*C08K 5/34* (2006.01)

(52) U.S. Cl. ............... 524/100; 524/101; 524/108; 524/110; 524/147; 524/151; 524/152; 524/153; 524/330; 524/245; 524/343; 524/347; 524/378; 524/377; 524/387; 524/388

(58) Field of Classification Search ............ 524/100, 524/101, 108, 245, 378, 377, 387, 388, 110, 524/147, 151, 152, 153, 330, 343, 347
See application file for complete search history.

(56) References Cited

U.S. PATENT DOCUMENTS

| 3,337,495 | A | 8/1967 | Corbett et al. | |
|---|---|---|---|---|
| 2002/0006992 | A1* | 1/2002 | Wick et al. | 524/94 |
| 2003/0193041 | A1 | 10/2003 | Semen | |
| 2006/0052491 | A1* | 3/2006 | Braig et al. | 524/99 |

FOREIGN PATENT DOCUMENTS

| EP | 0781803 | A1 | 7/1997 |
|---|---|---|---|
| EP | 0934972 | A2 | 8/1999 |
| EP | 1308084 | A1 | 5/2003 |
| GB | 961480 | | 6/1964 |
| JP | 63170439 | | 7/1988 |
| WO | 03099918 | A1 | 12/2003 |

* cited by examiner

*Primary Examiner*—Peter D Mulcahy
(74) *Attorney, Agent, or Firm*—Joseph Suhadolnik

(57) ABSTRACT

A polyolefin composition which comprises: (a) a polyolefin containing transition metal catalyst residue (excluding metallic co-catalyst residues) at a level below 5 ppm based on the weight of the polyolefin; (b) optionally a first stabilizing component consisting of a phenolic antioxidant or mixture of phenolic antioxidants; (c) optionally a second stabilizing component consisting of a phosphite antioxidant or a mixture of phosphite antioxidants; and (d) a third stabilizing component which acts also as a color suppressant and which is a polyfunctional alcohol, amine or amide or mixtures thereof, with at least one of (b) and (c) present and with the proviso that if the phosphite antioxidant is trilauryl phosphite it must be used in combination with another phosphite. The preferred stabilizing components (b) is 1,3,5-tris(4-tert-butyl-3-hydroxy-2,6 dimethyl,benzyl)-1,3,5-triazine-2,4,6-(1H,3H, 5H)-trione or mixed tocopherols. The preferred stabilizing component (c) is Tris(mono-nonylphenyl)phosphite, Tris(2, 4-di-t-butylphenyl)phosphite or bis(2,4-di-t-butyl phenyl) pentaerythritol diphosphite. The preferred stabilizing component (d) which also acts as a color suppressant component (d) is dipentaerythritol or tri-isopropanol amine. The preferred polyolefins are polypropylene and polyethylene. The polyolefin composition also may contain a hindered amine stabilizer (HAS) and an acid scavenger (e.g. calcium stearate).

18 Claims, No Drawings

COLOUR STABILISED POLYOLEFINS

This invention relates to stabilised polyolefin compositions, more particularly but not exclusively to stabilised polypropylene bi-oriented film and raffia.

Polypropylene (PP) bi-oriented film and raffia represent a major part of polypropylene end-uses. For these applications the PP must keep some of its properties when stored as granules before use, during extrusion and during subsequent processing and uses.

The retention of these properties can be assessed by simple measurements like:
  Melt flow protection
  Colour stability
  Storage stability measured for instance by colour evolution during storage To achieve this retention of properties, additives are usually added to PP consisting most typically of a mixture in ratios going from 1/1 up to 1/4 of phenolic antioxidants with phosphite antioxidants. These blends—known in the trade as B-Blends—are typically made for instance with a mixture of tetrakismethylene (3,5-di-t-butyl-4-hydroxyhydrocinnamate) methane (Anox 20—CAS No. 6683-19-8) for the phenolic antioxidant and tris(2,4-di-t-butylphenyl)phosphite (Alkanox 240—CAS No. 31570-04-4) for the phosphite antioxidant.

In a previous patent application WO 03/099918 it has been claimed that mixtures of phenolic antioxidants with phosphite antioxidants in ratios much higher (1:10 to 1:20) than the current ratios range (1/1 to 1/4) can offer benefits specially for fibre spinning in terms of the balance of:
  Melt flow protection
  Colour protection
  Peroxide interactions
  Gas fading resistance This concept of high phosphite blends was developed in parallel with other concepts also developed mainly for fibre spinning in which the phenolic antioxidants are totally substituted by other stabilisers, such as for example, benzofuranones or dialkylhydroxylamines. These last mentioned systems are known as phenol-free stabilisations and have been used for demanding fibre spinning applications.

The phenol-free system concept has been extended to less critical applications like bi-oriented film and raffia but in these cases the practice is to substitute only part of the mixture of phenolic and phosphite antioxidants by, for example, a lactone as in the blend known in the trade as Irganox HP2225 containing 42.5% of tetrakismethylene (3,5-di-t-butyl-4-hydroxyhydrocinnamate) methane (CAS No 6683-19-8) for the phenolic antioxidant; 42.5% tris(2,4-di-t-butylphenyl)phosphite for the phosphite antioxidant (CAS No 31570-04-4) and 15% of 2(3H)-benzofuranone 5,7-(1,1-dimethylethyl-3-hydroxy-reaction products with o-xylene (CAS No 181314-48-7).

In investigating how to widen the concept of high phosphite blends to polypropylene applications other than fibres it has been found that phosphite-rich systems can be applied beneficially to other applications, such as in particular bi-oriented polypropylene films (BOPP) where mixtures of phenolic antioxidant(s) with high proportions of phosphite antioxidant(s) can offer for the same addition level, simultaneously better melt flow protection coupled with better colour protection during processing than the conventionally used (1/1 to 1/4) mixtures, used but less melt flow protection and better colour protection than commercial systems where part of the phenolic antioxidant and phosphite antioxidant has been replaced by alternative stabilisers such as lactones. However those blends with a high proportion of phosphites, like the blends containing lactones show both poor retention of colour during storage as can be judged by accelerated testing in hot air ovens.

Surprisingly, we have found that replacement of part of the phenolic antioxidant and of the phosphite antioxidant in the aforementioned high phosphite blends with multifunctional polar molecules allows at the same time retention of the melt flow protection performance conferred by the additive blends and noticeably improves the colour retention during storage. This improvement is accompanied by the already known effects of colour improvement during processing (see Example 1 below).

This colour improvement has already been known for some time in the trade for PP stabilised with phenolic antioxidants and other secondary antioxidants (see for example, U.S. Pat. No. 3,337,495 and GB 961,480). However, this effect was discovered for PP as was currently available more than 40 years ago, i.e. containing a much higher level of transition metal catalyst residues than is normally available today (as high as 5 to 1000 ppm titanium for PP at that time against currently 1 or less than 1 to 5 ppm now) (see for instance GB 961,480 and Japanese patent 63-170439). Surprisingly, we have also found that the addition of multifunctional polar molecules is also very effective not only as colour suppressants but also as processing stabilisers for PP produced by modern polymerisation technologies and characterised by very low catalyst residues. This discovery has been also confirmed for LLDPE—linear low density polyethylene—and HDPE—high density polyethylene—produced by modern polymerisation technologies (see examples 3, 4 and 5 below).

The improvements observed in this discovery suggest that these multifunctional polar molecules could partly or totally replace phosphite antioxidant and that there could be a synergistic effect between phosphite antioxidants and the multifunctional polar materials.

In particular it has been found that the inventive concept is useful for any kind of polyolefins obtainable by polymerising together either a single olefin like ethylene or propylene to form homopolymers or polymerizing a mixture of two, three or several olefins like
  propylene and ethylene in a polypropylene block copolymer
  propylene and ethylene or ethylene and butene in a polypropylene random copolymer
  ethylene and 1-butene, or 1-hexene, or 1-octene, or another alpha-olefin in high density polyethylene (HDPE) or linear low density polyethylene (LLDPE).

According to the present invention, there is provided a polyolefin composition which comprises:
  (a) a polyolefin containing transition metal catalyst residue (excluding metallic co-catalyst residues) at a level below 5 ppm based on the weight of the polyolefin;
  (b) optionally a first stabilising component consisting of a phenolic antioxidant or a mixture of phenolic antioxidants;
  (c) optionally a second stabilising component consisting of a phosphite antioxidant or a mixture of phosphite antioxidants; and
  (d) a third stabilising component which acts also as a colour suppressant and which is a polyfunctional alcohol, amine or amide or mixtures thereof,
  with at least one of (b) and (c) present and with the proviso that if the phosphite antioxidant is trilauryl phosphite it must be used in combination with another phosphite.

In this specification, metal co-catalyst residues means metallic residues coming from co-catalysts such as for example, aluminium coming from the alkylation co-catalyst. Although, modern catalyst technology has provided a dramatic reduction in the level of transition metals such as titanium this does not apply to co-catalysts. For instance, in the Examples 1 and 2 included in this specification, the level of co-catalysts metallic residues is 106 ppm of aluminium.

Suitably, stabilising components (b) and (c) are both present and are mixed in ratios between 1/1 and 1/20.

The metallic element of the catalyst residue is titanium, zirconium, chromium or another transition element or mixtures thereof.

Preferably, stabilising component (b) is a semi-hindered or low hindered phenol antioxidant, most preferably 1,3,5-tris (4-tert-butyl-3-hydroxy-2,6-dimethylbenzyl)-1,3,5-triazine-2,4,6-(1H, 3H, 5H)-trione (=Lowinox® 1790—CAS No 40601-76-1) or mixed tocopherols.

Mixed tocopherols are to be understood as mixtures of α, β, γ and δ tocopherols as for instance vitamin E from natural origin in which the components may vary in concentrations depending on the natural source (e.g. products from Cargill Inc.).

Conveniently, stabilising component (b) is present in an amount of 20 ppm to 1000 ppm, preferably 100 to 500 ppm, based on the weight of the polyolefin.

Preferred stabilising components (c) are Tris(2,4-di-t-butylphenyl)phosphite (=Alkanox 240—CAS No 31570-04-4), Tris(mono-nonylphenyl)phosphite (=Weston 399 TNPP—CAS No 26523-78-4) and bis(2,4-di-t-butylphenyl)pentaerythritol diphosphite (=Ultranox 626—CAS 26741-53-7).

Conveniently, stabilising component (c) is present in an amount of 50 to 2000 ppm, preferably 250 to 1500 ppm, based on the weight of the polyolefin.

Preferably, the stabilising and colour suppressant polyfunctional alcohol is dipentaerythritol.

Preferably, the stabilising and polyfunctional amine is tri-isopfopanol amine (TIPA, CAS 122-20-3).

Preferably, the stabilising and polyfunctional amide is 1,2-bis(3,5-di-t-butyl-4-hydroxyhydrocinnamoyl)hydrazine (Lowinox MD-24, CAS-322687-78-8). Lowinox is trademark of Great Lakes (Germany) Manufacturing GmbH, now Chemtura Manufacturing GmbH.

Conveniently, stabilising and colour suppressant component (d) is present in an amount of 50 to 1500 ppm, preferably 150 to 500 ppm, based on the weight of the polyolefin.

Suitably, the polyolefin composition of the invention contains a fourth stabilising component (e) which is a hindered amine stabiliser.

Preferably, stabilising component (e) is selected from at least one of Dimethyl succinate polymer with 4-hydroxy-2,2,6,6-tetramethyl-1-piperidine ethanol (Lowilite® 62—CAS No 65447-77-0), Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] (Lowilite® 94—CAS No 71878-19-8) or 1,3,5-Triazine-2,4,6-triamine, N,N'''-1,2-ethanediylbis[N-[3-[[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)-(Lowilite® 19—CAS 106990-43-6). Lowilite is trademark of Great Lakes (Germany) Manufacturing GmbH, now Chemtura Manufacturing GmbH.

Conveniently, stabilising component (e) is present in an amount of 50 to 3000 ppm, preferably 200 to 2000 ppm, based on the weight of the polyolefin.

Suitably, the polyolefin of the invention contains an acid scavenger as component (f).

Preferably, the acid scavenger component (f) is a metal oxide, a salt of a fatty acid with a light metal such as calcium stearate, zinc stearate, magnesium stearate or a hydrotalcite or mixtures thereof.

Conveniently, acid scavenger component (f) is present in an amount of 50 to 3000 ppm, preferably 300 to 1500 ppm, based on the weight of the polyolefin.

Preferably, the total amount of components (b), (c), (d), (e) and (f) is present in an amount of 500 to 5000 ppm, preferably 1000 to 3000 ppm based on the weight of the polyolefin.

Suitably, the polyolefin is polypropylene or polyethylene.

In case of a polyolefin composition wherein the polyolefin is polypropylene and the transition metal catalyst residue is vanadium the polymer (excluding metallic cocatalyst residues) comprises less than 0.5 ppm vanadium.

The present invention is also directed to articles made from a polyolefin composition as herein described and claimed.

Further a process for producing polyolefin compositions comprising homogenisation of the additives into the polymer by melt extrusion or dispersion of liquidized or powdered additives is disclosed by this invention.

By further optimisation of the additive blends of the invention to achieve the same melt flow protection as that achieved with blends containing lactones, it has been found that the mixtures of Phenolic antioxidant Phosphite antioxidant Multifunctional polar molecules, typically poly-functional alcohols and optionally a HAS—hindered amine stabiliser—as described in WO 03/099918 together with a suitable acid scavenger can offer new higher combinations in terms of the balance between:

Melt flow protection

Colour protection during processing

Colour retention during storage.

This improved combination of properties can be exploited in Particular but not exclusively in polypropylene applications where orientation or large deformation is involved as in particular in films, bi-oriented films, raffia and sheet for thermoforming but also in other applications where the same formulations are used for commercial production rationalisation reasons such as in pipe extrusion, blow moulding and injection moulding.

The phenolic antioxidant (component (b)) can be selected from the group consisting of:

either high hindrance phenols, preferably but not exclusively: tetrakismethylene(3,5-di-t-butyl-4-hydroxyhydrocinnamate)methane (Anox 20—CAS No 6683-19-8); octadecyl 3-(3',5'-di-t-butyl-4'-hydroxyphenyl) propionate (Anox PP18—CAS No 2082-79-3); C9-C11 linear and branched alkyl esters of 3-(3',5'-di-t-butyl-4'-hydroxyphenyl)propionic acid (Irganox® 1135—CAS No); C13-C15 linear and branched alkyl esters of 3-(3', 5'-di-t-butyl-4'-hydroxyphenyl)propionic acid (Anox 1315—CAS No 171090-93-0); 2,2'thiodiethylene bis[3 (3,5-di-t-butyl-4-hydroxyphenyl)propionate] (Anox 70—CAS No 41484-35-9); 1,3,5-tris(3,5-di-t-butyl-4-hydroxybenzyl)isocyanurate (Anox IC14—CAS No 27676-62-6); 1,3,5-trimethyl-2,4,6-tris(3,5-di-t-butyl-4-hydroxybenzyl)benzene (Anox 330—CAS No 1709-70-2); N,N'-hexamethylene bis[3-(3,5-di-t-butyl-4-hydroxyphenyl)propionamide] (Lowinox® HD98—CAS No 23128-74-7); 1,2-bis(3,5-di-t-butyl-4-hydroxyhydrocinnamoyl)hydrazine (Lowinox® MD24—CAS No 32687-78-8). Mixtures thereof are also suitable.

or lower hindered phenols, i.e. a phenol which has some steric hinderance, but not at the high level of steric hinderance of the more common antioxidants based on 2,6-di-t-butylphenol. Examples are 1,3,5-tris(4-tert-butyl-3-hydroxy-2,6-dimethylbenzyl)-1,3,5-triazine-2,4,6-(1H,3H,5H)-trione (Lowinox® 1790—CAS No 40601-76-1); 2,2'-methylenebis(6-t-butyl-4-methylphenol) (Lowinox® 22 M46—CAS No 119-47-1); 4,4'-butylidenebis(2-t-butyl-5-methylphenol) (Lowinox® 44B25—CAS No 85-60-9); 2,2'-isobutylidenebis(4,6-dimethylphenol) (Lowinox® 22IB46—CAS No 33145-10-7); and 1,1,3-tris(2'-methyl-4'-hydroxy-5'-t-butylphenyl)butane (Lowinox® CA22—CAS No 1843-03-4); 2,5-Di-t-amylhydroquinone (Lowinox® AH25—CAS No 79-74-3); 2,2'-Methylene-bis(4-methyl)-6-(1-methyl cyclohexyl)phenol (Lowinox® WSP—CAS No 77-62-3); 4,4'-Thiobis(2-t-butyl-5-methylphenol) (Lowinox® TBM6—CAS No 96-69-5); 2,2'-Thiobis(6-t-butyl-4-methyl phenol) (Lowinox® TBP6—CAS No 90-66-4); and Triethylene glycol bis[3-(3-t-butyl-4-hydroxy-5-methylphenyl)propionate] (Lowinox® GP45—CAS No 36443-68-2), synthetic alpha-tocopherol (CAS No 10191-41-0) and mixed tocopherols as found in Vitamin E. Mixtures thereof are also suitable.

Irganox® is trademark of Ciba Specialty Chemicals Holding Inc.

Although many kinds of phenol antioxidants can be used in the present invention, the desired effects are more noticeable with the lower hindered phenols.

The phosphite antioxidant (component (c)) is preferably but not exclusively selected from at least one of:

Tris(4-n-nonylphenyl)phosphite (TNPP—CAS No 26523-78-4), Tris(mono-nonylphenyl)-phosphite, Tris(2,4-di-t-butylphenyl)phosphite (Alkanox 240—CAS No 31570-04-4), distearylpentaerythritol disphosphite (Weston 618—CAS No 3806-34-6), Bis(2,4-di-t-butylphenyl) pentaerythritol diphosphite (Ultranox 626, Alkanox P-24—CAS No 26741-53-7), Tetrakis(2,4-di-t-butylphenyl)-4,4'-biphenylene diphosphonite (Alkanox 24-44—CAS No 38613-77-3), 2,4,6-tri-tert-butylphenyl-2-butyl-2-ethyl-1,3-propanediol phosphite (Ultranox 641—CAS 161717-32-4), Bis(2,4-dicumylphenyl)pentaerythritol diphosphite (Doverphos 9228—CAS No 154862-43-8).

Suitably, the phosphate antioxidant does not comprise thiophosphites.

The polyfunctional alcohol can be selected preferably but not exclusively from:

polyethylene glycols having general formula H{O(CH$_2$)$_m$}$_n$—OH, typically diethylene glycol, triethylene glycol or tetraethylene glycol polyhydric alcohols such as glycerol, erythritol, pentaerythritol, dipentaerythritol or sorbitol oligomers or polymers obtained by oligomerisation or polymerisation of polyalcohols like in particular polypentaerythritols.

The HAS—(hindered amine stabiliser) (component (e)) is preferably but not exclusively selected from at least one of Dimethyl succinate polymer with 4-hydroxy-2,2,6,6-tetramethyl-1-piperidine ethanol (Lowilite® 62—CAS No 65447-77-0), Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino] (Lowilite® 94—CAS No 71878-19-8) or 1,3,5-Triazine-2,4,6-triamine, N,N'''-1,2-ethanediylbis[N-[3-[[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)-(Lowilite® 19—CAS 106990-43-6).

Additional examples of components (b), (c) and (e) which are suitable for use in the present invention are included in the lists of phenol antioxidants, phosphite antioxidants and HAS set forth in EP-A1-1 338 622.

General Description of the Preparation for the Examples Below of the Stabiliser Blends of the Invention in Polypropylene or Polyethylene Powder.

A) Mixing of the Additives

Mixing of the additives, which can be phenolic antioxidants, phosphite antioxidants, hindered amine antioxidants, acid scavengers, polyfunctional alcohols and others, with the polyolefins, like polypropylene or polyethylene, powder is done as described below and depends highly on the physical form of the stabilisers. The additives can be used in powder form, liquid form and in No Dust Blend (NDB) form.

1. Additives in Powder Form:

50% of the polyolefin, e.g. polypropylene or polyethylene, powder is weighed into a plastic bag, the powder additives are weighed separately and added to the polyolefin, e.g. polypropylene- or polyethylene-powder in the bag. The remaining polyolefin, e.g. polypropylene- or polyethylene-powder is then added and the bag is blown up with nitrogen and shaken for at least 2 minutes in different directions.

2. Additives in Liquid Form:

As described in paragraph 1 above, 50% of the polyolefin, e.g. polypropylene- or polyethylene-powder is weighed into a plastic bag, and then a small amount of the polyolefin, e.g. polypropylene or polyethylene (which is subtracted from the total polyolefin, e.g. polypropylene or polyethylene amount) is then weighed in an aluminium pan. To this pan containing polyolefin, e.g. polypropylene or polyethylene-powder, the correct amount of liquid additive is added via a pipette and mixed with the polyolefin, e.g. polypropylene- or polyethylene-powder with a spatula for about 10 minutes (or until a homogeneous powder mixture is formed). The content of the aluminium pan is then added to the polyolefin, e.g. polypropylene- or polyethylene-powder in the plastic bag, the remaining polyolefin, e.g. polypropylene- or polyethylene-powder is added and the bag is blown up with nitrogen and shaken for at least 2 minutes in different directions.

3. Additives in NDB Form:

NDB (non dust blend) blends are a preblend of additives without polymer carrier made according to U.S. Pat. No. 5,240,642 and European Application EP-A 1-0 514 784. Similar blends are available from alternative suppliers which are referred to as 'one packs'. When the additives are in this specific physical form, the NDB or 'one-pack' is first crushed to powder again by means of a mortar and pestle. To mix the additives with the polyolefin, e.g. polypropylene- or polyethylene-powder the method as described in paragraph 1 above can be followed.

B) Processing of the Additive/Polyolefin, e.g. Polypropylene- or Polyethylene-Powder Mixture After 2 minutes shaking of the plastic bag, the mixture is poured into the hopper of a Brabender single screw extruder (Compression ratio 3:1, L/D 25, screw diameter 19 mm, screw speed 60 rpm).

The mixture is extruded on the Brabender single screw extruder using the following settings:

Temperature profile for PP: 200-215-235-250° C.

Temperature profile for LLDPE and HDPE: 175-175-180-190° C.

1 extrusion pass under nitrogen blanket

Strands are collected and pelletised. This first extrusion pass is referred to as the compounding pass or pass zero.

In order to evaluate the performance of different additive formulations, the compound after pass zero, is extruded on the Brabender single screw extruder using the following settings:

Temperature profile for PP: 200-225-250-275° C.

Temperature profile for LLDPE and HDPE: 200-210-220-230° C.

5 extrusion passes in open air.

After each extrusion pass the strands are caught up and pelletised. Pellets are collected after the $1^{st}$, $3^{rd}$ and $5^{th}$ extrusion pass for further measurements (colour measurements, melt flow measurements) whereas oven ageing performances are measured on pellets collected after $2^{nd}$ extrusion pass.

C) Testing of the Performance of Different Formulations

Measuring the Yellowing Index (YI) on pellets, which are collected after the 1st, 3rd and 5th extrusion pass determines the colour stability of a formulation. Yellowing index is measured according to standard ASTM E313.

Measuring the melt flow (MFI) on pellets, again collected after the $1^{st}$, $3^{rd}$ and $5^{th}$ extrusion pass determines the processing stability of a formulation. The melt flow is measured according to standard ISO 1133.

At 230° C. and with a load of 2.16 kg for PP

At 190° C. and with loads of 10 kg and 21.6 kg for LLDPE and HDPE. The loads selected for those two polymers are not commonly used but allow achieving a better experimental accuracy.

Measuring the storage stability on pellets which are collected after $2^{nd}$ extrusion pass is done by exposing them for several days in hot air oven and measuring then the YI.

EXAMPLE 1

Example 1 relates to additive formulations in PP resin, polymerised in a gas phase process with titanium catalyst residue=3.3 ppm Mixing, processing and testing of the formulations are carried out as in the general description set forth above.

2000 ppm overall loading

Formulation 1: 500 ppm calcium stearate+500 ppm Anox 20+1000 ppm Alkanox 240 (=B-Blends reference)

Formulation 2: 500 ppm calcium Stearate+1500 ppm Irganox® HP 2225 (=lactone based stabilisation)

Formulation 3: 500 ppm calcium stearate+150 ppm Lowinox® 1790+1350 ppm Alkanox 240 (=high phosphite formulation according to WO 03/099918 patent)

Formulation 4: 500 ppm calcium Stearate+100 ppm Lowinox® 1790+900 ppm Alkanox 240+500 ppm dipentaerythritol (=formulation according to the present invention)

TABLE 1

| Formulation | MFI (230/2.16) | | | | Delta MFI |
| | Pass 0 | Pass 1 | Pass 3 | Pass 5 | (pass 5 − pass 0) |
| --- | --- | --- | --- | --- | --- |
| Form 1 | 2.25 | 2.53 | 2.93 | 3.24 | 0.99 |
| Form 2 | 2.30 | 2.13 | 2.28 | 2.47 | 0.17 |
| Form 3 | 2.16 | 2.26 | 2.47 | 2.87 | 0.71 |
| Form 4 | 2.28 | 2.47 | 2.69 | 3.00 | 0.72 |

TABLE 2

| Formulation | Yellow Index | | | | Delta YI |
| | Pass 0 | Pass 1 | Pass 3 | Pass 5 | (pass 5 − pass 0) |
| --- | --- | --- | --- | --- | --- |
| Form 1 | −1.78 | 1.10 | 4.58 | 6.85 | 8.63 |
| Form 2 | 0.28 | 1.80 | 4.60 | 6.62 | 6.34 |
| Form 3 | −0.02 | 1.15 | 2.86 | 4.12 | 4.14 |
| Form 4 | −2.08 | −1.16 | 0.26 | 1.07 | 3.15 |

TABLE 3

| | YI measured on granules from pass 2 stored at 50° C. in hot air | | | |
| Formulation | Initial | 22 days | Delta |
| --- | --- | --- | --- |
| Form 1 | 3.20 | 5.18 | 1.98 |
| Form 2 | 4.09 | 7.24 | 3.14 |
| Form 3 | 2.30 | 3.95 | 1.65 |
| Form 4 | −0.57 | 0.92 | 1.50 |

TABLE 4

| | YI measured on granules from pass 2 stored at 120° C. in hot air | | | | | |
| Formulation | Initial | 2 days | 3 days | 8 days | 16 days | Delta |
| --- | --- | --- | --- | --- | --- | --- |
| Form 1 | 3.20 | 5.39 | 7.47 | 9.47 | 10.96 | 7.76 |
| Form 2 | 4.09 | 9.11 | 11.00 | 15.58 | 17.90 | 13.81 |
| Form 3 | 2.30 | 9.29 | 13.97 | 15.62 | 19.12 | 16.82 |
| Form 4 | −0.57 | 0.86 | 2.63 | 4.04 | 5.34 | 5.91 |

As can be seen from Tables 1 and 2, high phosphite formulation (formulation 3) can substitute current formulations (B-blends e.g. formulation 1) offering better molecular protection and markedly better colour after processing. However the molecular protection is not as good as the one achieved with formulation containing lactone (formulation 2) but the colour protection is much better.

Substitution of part of high phosphite formulation (formulation 3) by dipentaerythritol allows reaching the same molecular protection but with a much better colour protection.

As can be seen in Tables 3 and 4, accelerated oven ageing performances of both formulation containing lactone (formulation 2) and formulation containing high level of phosphite (formulation 3) are poor but can be significantly improved by replacing part of high phosphite formulation by dipentaerythritol.

It could also be noticed that the improvement brought by the substitution of part of the high phosphite formulation (formulation 3) by dipentaerythritol is becoming much more effective with increased temperature as shown in the following table:

TABLE 5

| Temperature | Ageing (days) | Formulation 3 | | | Formulation 4 | | | Delta (4 − 3) |
|---|---|---|---|---|---|---|---|---|
| | | Initial | Aged | delta | Initial | Aged | Delta | |
| Ambient −20° C. | 28 d | −0.02 | 0.06 | 0.08 | −2.08 | −1.98 | 0.10 | 0.02 |
| 50° C. | 22 d | 2.30 | 3.95 | 1.65 | −0.57 | 0.92 | 1.50 | −0.15 |
| 120° C. | 16 d | 2.30 | 19.12 | 16.82 | −0.57 | 5.34 | 5.91 | −10.91 |

EXAMPLE 2

Example 2 relates to additive formulations of the invention in PP resin, polymerised in a gas phase process with titanium catalyst residue=3.3 ppm.

Mixing, processing and testing of the formulations are carried out as in the general description set forth above.

1700 ppm Overall Loading

Formulation 5: 500 ppm calcium stearate+400 ppm Anox 20+800 ppm Alkanox 240=common B-Blend formulation)

Formulation 6: 500 ppm calcium stearate+1200 ppm Irganox HP 2225 (=lactone based stabilisation)

Formulation 7: 500 ppm calcium stearate+250 ppm Lowinox 1790+700 ppm Alkanox 240+250 ppm dipentaerythritol (=formulation according to the present invention)

TABLE 6

| | MFI (230/2.16) | | | | Delta MFI |
|---|---|---|---|---|---|
| Formulation | Pass 0 | Pass 1 | Pass 3 | Pass 5 | (pass 5 − pass 0) |
| Form 5 | 2.32 | 2.54 | 2.87 | 3.30 | 0.99 |
| Form 6 | 2.17 | 2.19 | 2.46 | 2.76 | 0.59 |
| Form 7 | 2.19 | 2.20 | 2.31 | 2.52 | 0.34 |

TABLE 7

| | Yellow Index | | | | Delta YI |
|---|---|---|---|---|---|
| Formulation | Pass 0 | Pass 1 | Pass 3 | Pass 5 | (pass 5 − pass 0) |
| Form 5 | −0.88 | 1.18 | 4.39 | 7.6 | 7.94 |
| Form 6 | −0.80 | 0.30 | 2.35 | 3.87 | 4.67 |
| Form 7 | −1.28 | −0.82 | 1.36 | 3.55 | 4.84 |

TABLE 8

| | YI measured on granules from pass 2 stored at 50° C. in hot air | | |
|---|---|---|---|
| Formulation | Initial | 14 days | Delta |
| Form 5 | 2.62 | 4.81 | 2.19 |
| Form 6 | 1.39 | 4.79 | 3.40 |
| Form 7 | 0.19 | 1.35 | 1.16 |

TABLE 9

| | YI measured on granules from pass 2 stored at 120° C. in hot air | | | | | |
|---|---|---|---|---|---|---|
| Formulation | Initial | 3 days | 6 days | 9 days | 14 days | Delta |
| Form 5 | 2.62 | 5.82 | 8.64 | 9.34 | 11.69 | 9.07 |
| Form 6 | 1.39 | 5.90 | 8.07 | 9.16 | 10.71 | 9.32 |
| Form 7 | 0.19 | 4.06 | 7.39 | 8.50 | 10.71 | 10.52 |

As shown in Tables 6 and 7 above, an optimised formulation for BOPP application according to this invention (formulation 7) allows keeping a better control of melt flow index and consequently to achieve better process control than a formulation based on lactone (formulation 6) and a much better control than a current formulation (formulation 5) offering at the same time the best colour protection.

Moreover, as can be seen from Tables 8 and 9, this optimised formulation allows a much better colour protection during storage at moderately high temperature (50° C.) but this advantage is not kept at higher temperature (120° C.).

The difference of ageing performances at high temperature (120° C.) between what has been observed for formulation 4 in Example 1 and what is observed for formulation 7 in Example 2 is probably due to the fact that the total level of dipentaerythritol and phosphite acting in synergy is much higher in the former case than in the latter as shown in the following Table 10:

TABLE 10

| Formulation | Dipentaerythritol (ppm) | Phosphite (ppm) | Total of synergists (ppm) |
|---|---|---|---|
| Formulation 4 | 500 | 900 | 1400 |
| Formulation 7 | 250 | 700 | 950 |

EXAMPLE 3

Example 3 relates to additive formulations of the invention in HDPE resin—density 0.955 g/cm³, co-monomer=1-hexene-polymerised in a loop slurry process with chromium catalyst residue=3.5 ppm.

Mixing, processing and testing of the formulations are carried out as in the general description to set forth above.

Formulation 8: 500 ppm zinc stearate+400 ppm Anox 20+800 ppm Alkanox 240 (=standard B-Blend formulation for this kind of polymer)

Formulation 9: 500 ppm zinc stearate+200 ppm Lowinox 1790+800 ppm Alkanox 240 (formulation based on high performance semi-hindered phenolic antioxidant)

Formulation 10: 500 ppm zinc stearate+200 ppm Lowinox 1790+500 ppm Alkanox 240+300 ppm dipentaerythritol (=formulation according to the present invention)

Formulation 11: 500 ppm zinc stearate+200 ppm Lowinox 1790+500 ppm Ultranox 626 (formulation based on high performance semi-hindered phenolic antioxidant and on high performance phosphite)

Formulation 12: 500 ppm zinc stearate+200 ppm Lowinox 1790+350 ppm Ultranox 626+300 ppm dipentaerythritol (=formulation according to the present invention)

For current phosphite (Alkanox 240), the melt indexes measured in g/10 min and under two loads of 10 and 21.6 kg are summarised in the following table:

TABLE 11

| | MI (190° C., 10 kg) | | | MI (190° C., 21.6 kg) | | | ΔMI (pass 5 − pass 0) | |
|---|---|---|---|---|---|---|---|---|
| Form | Pass 0 | Pass 1 | Pass 5 | Pass 0 | Pass 1 | Pass 5 | 10 kg | 21.6 kg |
| F 8 | 4.11 | 4.13 | 4.37 | 19.90 | 20.18 | 22.75 | 0.26 | 2.85 |
| F 9 | 4.05 | 4.28 | 4.84 | 20.24 | 21.09 | 24.17 | 0.79 | 3.93 |
| F 10 | 3.92 | 4.10 | 4.29 | 19.88 | 19.27 | 20.40 | 0.37 | 0.52 |

The colour change measured on granules with current phosphite (Alkanox 240), as measured by YI is summarised in the following table:

TABLE 12

| Formulation | YI pass 0 | YI pass 1 | YI pass 5 | Δ YI (5 − 0) |
|---|---|---|---|---|
| Form 8 | −2.59 | −1.58 | +0.85 | 3.44 |
| Form 9 | −2.41 | −1.76 | +1.77 | 4.18 |
| Form 10 | −2.92 | −2.18 | −0.74 | 2.18 |

The comparison between formulations 9 and 10 shows that the replacement of 300 ppm of phosphite Alkanox 240 by an equivalent quantity of dipentaerythritol allows achieving a combination of good melt flow protection coupled to a significantly better colour. On the other hand comparison between formulations 8 and 10 shows that the formulation 10 according to the present invention surpasses the standard B-blend formulation 8 both in terms of melt flow protection and colour retention.

For high performance phosphite (Ultranox 626) compared to current phosphite (Alkanox 240), the melt indexes measured in g/10 min and under two loads of 10 and 21.6 kg are summarised in the following table:

TABLE 13

| | MI (190° C., 10 kg) | | | MI (190° C., 21.6 kg) | | | ΔMI (pass 5 − pass 0) | |
|---|---|---|---|---|---|---|---|---|
| Form | Pass 0 | Pass 1 | Pass 5 | Pass 0 | Pass 1 | Pass 5 | 10 kg | 21.6 kg |
| F 9 | 4.05 | 4.28 | 4.84 | 20.24 | 21.09 | 24.17 | 0.79 | 3.93 |
| F 11 | 3.94 | 4.15 | 4.42 | 19.21 | 19.43 | 22.00 | 0.49 | 2.79 |
| F 12 | 4.00 | 4.09 | 4.39 | 19.05 | 19.82 | 21.79 | 0.39 | 2.74 |

And the colour changes measured on granules are summarised in the following table:

TABLE 14

| Formulation | YI pass 0 | YI pass 1 | YI pass 5 | Δ YI (5 − 0) |
|---|---|---|---|---|
| Form 9 | −2.41 | −1.76 | +1.77 | 4.18 |
| Form 11 | −3.05 | −2.69 | −1.85 | 1.20 |
| Form 12 | −2.98 | −2.69 | −1.96 | 1.02 |

Comparison between formulations 9 and 11 illustrates the effect of high performance phosphite even used at a lower level on both melt flow protection and colour protection whereas comparison between formulations 11 and 12 illustrates how the present invention allows to reduce still the high performance phosphite level offering at the same time both slightly better melt flow protection and colour retention.

The oven ageing at 50° C. as measured by the YI of the injection moulded plaques are summarised in the following table:

TABLE 15

| | Oven ageing time at 50° C. | | | | |
|---|---|---|---|---|---|
| Formulation | 0 hours | 165 hours | 326 hours | 488 hours | Δ at 50° C. |
| Form 8 | −2.68 | −2.55 | −2.61 | −2.62 | 0.07 |
| Form 9 | −2.81 | −2.68 | −2.51 | −2.58 | 0.23 |
| Form 10 | −2.89 | −2.74 | −2.79 | −2.91 | −0.01 |
| Form 11 | −3.07 | −3.06 | −3.08 | −3.14 | −0.07 |
| Form 12 | −3.14 | −3.04 | −3.13 | −3.09 | 0.05 |

This shows clearly the superiority of the formulations (10 and 12) based on this present discovery.

EXAMPLE 4

Example 4 relates to additive formulations of the invention in LLDPE resin—density 0.920 g/cm$^3$, co-monomer=1-butene-polymerised in a gas phase reactor with a Ziegler-Natta catalyst supported on silica and a titanium catalyst residue=2.5 ppm.

Mixing, processing and testing of the formulations are carried out as in the general description set forth above.

Formulation 13: 500 ppm zinc stearate+100 ppm mixed tocopherols+800 ppm TNPP (=formulation based on low hindered phenolic antioxidant)

Formulation 14: 500 ppm zinc stearate+100 ppm mixed tocopherols+300 ppm TNPP+300 ppm TIPA (=formulation according to the present invention)

Formulation 15: 500 ppm zinc stearate+100 ppm mixed tocopherols+300 ppm TNPP+300 ppm dipentaerythritol (=formulation according to the present invention)

The melt indexes measured in g/10 min and under two loads of 10 and 21.6 kg are summarised in the following table:

TABLE 16

| | MI (190° C., 10 kg) | | | MI (190° C., 21.6 kg) | | | ΔMI (pass 5 − pass 0) | |
|---|---|---|---|---|---|---|---|---|
| Form | Pass 0 | Pass 1 | Pass 5 | Pass 0 | Pass 1 | Pass 5 | 10 kg | 21.6 kg |
| F 13 | 7.03 | 7.02 | 7.06 | 23.08 | 23.20 | 23.21 | 0.03 | 0.13 |
| F 14 | 6.99 | 7.00 | 7.08 | 22.98 | 23.11 | 23.48 | 0.09 | 0.50 |
| F 15 | 7.01 | 7.16 | 7.10 | 23.41 | 23.52 | 23.97 | 0.09 | 0.56 |

And the colour changes measured on granules are summarised in the following table:

TABLE 17

| Formulation | YI pass 0 | YI pass 1 | YI pass 5 | Δ YI (5 − 0) |
|---|---|---|---|---|
| Form 13 | −1.21 | −0.38 | +2.84 | 4.04 |
| Form 14 | −1.61 | −1.46 | +1.32 | 2.93 |
| Form 15 | −1.42 | −0.80 | +2.07 | 3.48 |

For this resin, competition between cross-linking and chain scission degradation mechanism makes the interpretation of the melt indexes values changes difficult. The three formulations used show all a good melt flow protection.

On the colour side however, comparison between formulations 13 and 14 shows that the substitution of 300 ppm of TNPP phosphite by 300 ppm of TIPA allows achieving significantly better colour initially and this advantage is kept in multi-passes experiment. On the other hand, comparison between formulations 13 and 15 shows that the substitution of 300 ppm of TNPP phosphite by 300 ppm of dipentaerythritol allows also achieving better colour initially and this advantage is kept in multi-passes experiment. However, for this kind of resin and phosphite, results obtained with TIPA are better than those obtained with dipentaerythritol.

The oven ageing at 100° C. as measured by the YI of the injection moulded plaques are summarised in the following table:

TABLE 18

| | Oven ageing time at 100° C. | | | | |
|---|---|---|---|---|---|
| Formulation | 0 hours | 165 hours | 326 hours | 488 hours | Δ at 100° C. |
| Form 13 | 1.10 | 2.79 | 4.08 | 5.27 | 4.18 |
| Form 14 | 1.18 | 3.18 | −4.31 | 5.18 | 4.01 |
| Form 15 | 1.11 | 2.87 | 4.14 | 5.23 | 4.12 |

EXAMPLE 5

Example 5 relates to additive formulations of the invention in LLDPE resin—density 0.918 g/cm$^3$, co-monomer=1-hexene—polymerised in a gas phase reactor with a metallocene catalyst supported on silica and a zirconium catalyst residue below 0.2 ppm.

Mixing, processing and testing of the formulations are carried out as in the general description set forth above.

Formulation 16: 500 ppm zinc stearate+100 ppm mixed tocopherols+800 ppm TNPP (=formulation based on low hindered phenolic antioxidant)

Formulation 17: 500 ppm zinc stearate+100 ppm mixed tocopherols+300 ppm TNPP+300 ppm TIPA (=formulation according to the present invention)

Formulation 18: 500 ppm zinc stearate+100 ppm mixed tocopherols+300 ppm TNPP+300 ppm dipentaerythritol (=formulation according to the present invention)

The melt indexes measured in g/10 min and under two loads of 10 and 21.6 kg are summarised in the following table:

TABLE 19

| | MI (190° C., 10 kg) | | | MI (190° C., 21.6 kg) | | | ΔMI (pass 5 − pass 0) | |
|---|---|---|---|---|---|---|---|---|
| Form | Pass 0 | Pass 1 | Pass 5 | Pass 0 | Pass 1 | Pass 5 | 10 kg | 21.6 kg |
| F 16 | 5.16 | 5.04 | 4.48 | 14.49 | 14.55 | 13.30 | −0.68 | −1.19 |
| F 17 | 5.16 | 5.09 | 4.50 | 14.49 | 14.44 | 13.31 | −0.66 | −1.18 |
| F 18 | 5.18 | 5.13 | 4.33 | 14.60 | 14.46 | 12.93 | −0.85 | −1.67 |

Comparison of melt flow indexes measured for formulations 16 and 17 shows that replacing 300 ppm of TNPP phosphite by the same quantity of TIPA allows protecting as efficiently the melt flow. On the other hand it is not the case for a replacement of 300 ppm of TNPP phosphite by the same quantity of dipentaerythritol which does not allow reaching the same level of protection.

The colour changes measured on granules are summarised in the following table:

TABLE 20

| Formulation | YI pass 0 | YI pass 1 | YI pass 5 | Δ YI (5 − 0) |
|---|---|---|---|---|
| Form 16 | −1.49 | 0.49 | 4.00 | 5.49 |
| Form 17 | −1.96 | 0.29 | 2.84 | 4.79 |
| Form 18 | −1.67 | 0.19 | 3.30 | 4.97 |

Here again, the improvement in colour brought by either TIPA or dipentaerythritol can be observed.

EXAMPLE 6

Example 6 relates to additive formulations of the invention in PP resins made with different polymerisation techniques and different catalysts. To simplify the research phosphites have not been included in the formulations set in this experiment.

The different PP used were:

PP 1: Polypropylene homopolymer made by Unipol® (trademark of the DOW Chemical Company) gas phase polymerisation technology and with transition metal catalyst residue of 1.3 ppm titanium.

PP 2: Polypropylene homopolymer made by Spheripol® (trademark of Basell Holding BV) bulk polymerisation technology and with transition metal catalyst residue of 0.5 ppm titanium.

PP 3: Polypropylene homopolymer made by Novolen® (trademark of Novolen Technology Holding C.V.) gas phase polymerisation technology and with transition metal catalyst residue of 1.4 ppm titanium.

Mixing, processing and testing of the formulations are carried out as in the general description set forth above.

Formulation 19: 500 ppm zinc stearate+250 ppm 2-2'-isobutylidenebis(4,6-dimethylphenol)(=Lowinox® 22IB46−CAS No 33145-10-7)

Formulation 20: 500 ppm zinc stearate+250 ppm 2-2'-isobutylidenebis(4,6-dimethylphenol)(=Lowinox® 22IB46−CAS No 33145-10-7)+250 ppm dipentaerythritol.

Formulation 21: 500 ppm zinc stearate+250 ppm mixed tocopherols

Formulation 22: 500 ppm zinc stearate+250 ppm mixed tocopherols+250 ppm dipentaerythritol.

The results observed when using Lowinox® 22IB46 are summarised in the following table:

TABLE 21

| Form | PP | MI pass 0 | MI pass 5 | Δ MI pass 5 − 0 | YI pass 0 | YI pass 5 | Δ YI pass 5 − 0 |
|---|---|---|---|---|---|---|---|
| F 19 | PP 1 | 3.73 | 5.84 | 2.11 | +0.38 | +10.01 | +9.63 |
| F 20 | PP 1 | 4.07 | 6.34 | 2.27 | +0.56 | +3.12 | +2.56 |
| F 19 | PP 2 | 12.04 | 16.29 | 4.25 | −1.47 | +10.03 | +11.50 |
| F 20 | PP 2 | 12.54 | 18.11 | 5.57 | −1.53 | +3.24 | +4.77 |
| F 19 | PP 3 | 7.57 | 11.39 | 3.82 | +12.41 | +19.24 | +6.83 |
| F 20 | PP 3 | 8.70 | 15.11 | 6.41 | +7.60 | +15.08 | +7.48 |

The results observed when using mixed tocopherols are summarised in the following table:

TABLE 22

| Form | PP | MI pass 0 | MI pass 5 | Δ MI pass 5 − 0 | YI pass 0 | YI pass 5 | Δ YI pass 5 − 0 |
|---|---|---|---|---|---|---|---|
| F 21 | PP 1 | 3.95 | 6.54 | 2.59 | −0.19 | +12.10 | 12.28 |
| F 22 | PP 1 | 4.14 | 6.35 | 2.21 | −1.51 | +6.32 | 7.83 |
| F 21 | PP 2 | 12.67 | 17.24 | 4.57 | −0.92 | +10.11 | 11.02 |
| F 22 | PP 2 | 12.39 | 17.25 | 4.86 | −1.54 | +5.78 | 7.32 |
| F 21 | PP 3 | 8.42 | 15.01 | 6.59 | +5.89 | +17.60 | 11.71 |
| F 22 | PP 3 | 9.97 | 17.22 | 7.25 | +1.05 | +11.31 | 10.26 |

The results show that the addition of dipentaerythritol to polypropylenes characterised by low levels of transition metal catalysts residues and stabilised with low hindered phenolic antioxidants alone has no or even a slightly negative effect on melt index protection but a very high effect on colour in the three systems tried. This suggests that dipentaerythritol should be a good synergist to phosphite as the previous examples show that the replacement of a given quantity of phosphite by the same quantity of dipentaerythritol allows achieving at the same time a better melt flow protection and a better colour protection.

The invention claimed is:

1. A polyolefin composition which comprises:
   (a) a polyolefin containing transition metal catalyst residue (excluding metallic co-catalyst residues) at a level below 5 ppm based on the weight of the polyolefin;
   (b) a first stabilising component consisting of a phenolic antioxidant or a mixture of phenolic antioxidants selected from the group consisting of:
   1,3,5-tris(4-tert-butyl-3-hydroxy-2,6-dimethylbenzyl)-1,3,5-triazine-2,4,6-(1H,3H,5H)-trione;
   2,2'-methylenebis(6-t-butyl-4-methylphenol);
   4,4'-bu-tylidenebis(2-t-butyl-5-methylphenol);
   2,2'-isobutylidenebis(4,6-dimethylphenol);
   1,1,3-tris(2'-methyl-4'-hydroxy-5'-t-butylphenyl)butane;
   2,5-di-t-amylhydroquinone;
   2,2'-methylene-bis(4-methyl)-6-(1-methyl cyclohexyl) phenol;
   4,4'-thiobis(2-t-butyl-5-methylphenol);
   2,2'-thiobis(6-t-butyl-4-methyl phenol);
   triethylene glycol bis[3-(3-t-butyl-4-hydroxy-5-methylphenyl)propionate],
   synthetic alpha-tocopherol,
   and mixed tocopherols as found in Vitamin E;
   (c) a second stabilising component consisting of a phosphite antioxidant or a mixture of phosphite antioxidants with the proviso that if the phosphite antioxidant is trilauryl phosphite it must be used in combination with another phosphite; and
   (d) a third stabilising component which acts also as a colour suppressant and which is a polyfunctional alcohol selected from the group consisting of erythritol, pentaerythritol, dipentaerythritol, sorbitol, triisopropanolamine and polypentaerythritols wherein stabilising components (b) and (c) are present in a ratio of between 1/1 and 1/20.

2. The polyolefin composition according to claim 1 wherein the metallic element of the catalyst residue is titanium, zirconium, chromium or mixtures thereof.

3. The polyolefin composition as claimed in claim 1, wherein stabilising component (b) is 1,3,5-tris(4-tert-butyl-3-hydroxy-2,6-dimethylbenzyl)-1,3,5-triazine-2,4,6-(1H, 3H, 5H)-trione or mixed tocopherols.

4. The polyolefin composition as claimed in claim 1, wherein stabilising component (b) is present in an amount of 20 ppm to 1000 ppm based on the weight of the polyolefin.

5. The polyolefin composition as claimed in claim 1, wherein stabilising component (c) is tris(mono-nonylphenyl) phosphite, tris(2,4-di-t-butylphenyl)phosphite or bis(2,4-di-t-butylphenyl)pentaerythritol diphosphite.

6. The polyolefin composition as claimed in claim 1, wherein stabilising component (c) is present in an amount of 50 to 2000 ppm based on the weight of the polyolefin.

7. The polyolefin composition as claimed in claim 1, wherein stabilising component (d) dipentaerythritol or tri-isopropanol amine.

8. The polyolefin composition as claimed in claim 1, wherein component (d) is present in an amount of 50 to 1500 ppm based on the weight of the polyolefin.

9. The polyolefin composition as claimed in claim 1, which contains a fourth stabilising component (e) which is a hindered amine stabiliser.

10. The polyolefin composition as claimed in claim 9 wherein stabilising component (e) is selected from at least one of dimethyl succinate polymer with 4-hydroxy-2,2,6,6-tetramethyl-1-piperidine ethanol, poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] or 1,3,5-triazine-2,4,6-triamine, N,N'''-1,2-ethanediylbis[N-[3-[[4,6-bis[butyl(1,2,2,6,6-pentamethyl-4-piperidinyl)amino]-1,3,5-triazin-2-yl]amino]propyl]-N',N''dibutyl-N',N''-bis-(1,2,2,6,6-pentamethyl-4-piperidinyl).

11. The polyolefin composition as claimed in claim 1 wherein stabilising component (e) is present in an amount of 50 to 3000 ppm based on the weight of the polyolefin.

12. The polyolefin composition as claimed in claim 1, which contains an acid scavenger as component (f) selected from the group consisting of metal oxides, and light metal salts fatty acids.

13. The polyolefin composition as claimed in claim 12 wherein component acid scavenger component (f) is present in an amount of 50 to 3000 ppm based on the weight of the polyolefin.

14. The polyolefin composition as claimed in claim 10 wherein the total amount of components (b), (c), (d), (e) and (f) is present in an amount of 500 to 5000 ppm based on the weight of the polyolefin.

15. The polyolefin composition as claimed in claim 1, wherein the polyolefin is polypropylene or polyethylene.

16. The polyolefin composition as claimed in claim 1, wherein the polyolefin is polypropylene and the transition metal catalyst residue (excluding metallic cocatalyst residues) comprises less than 0.5 ppm vanadium.

17. Articles made from a polyolefin composition as claimed in claim 1.

18. A process for producing a polyolefin composition according to claim 1, comprising homogenising the additives into the polymer by melt extrusion or dispersing liquidized or powdered additives into the polymer.

* * * * *